United States Patent
Sekine et al.

(10) Patent No.: US 10,022,671 B2
(45) Date of Patent: Jul. 17, 2018

(54) EXHAUST GAS PURIFICATION DEVICE

(71) Applicant: CATALER CORPORATION, Kakegawa-shi, Shizuoka (JP)

(72) Inventors: Hiroshi Sekine, Kakegawa (JP); Suguru Matsui, Kakegawa (JP)

(73) Assignee: CATALER CORPORATION, Kakegawa-shi (JP)

( * ) Notice: Subject to any disclaimer, the term of this patent is extended or adjusted under 35 U.S.C. 154(b) by 0 days.

(21) Appl. No.: 15/571,801

(22) PCT Filed: Mar. 13, 2017

(86) PCT No.: PCT/JP2017/010010
§ 371 (c)(1),
(2) Date: Nov. 3, 2017

(87) PCT Pub. No.: WO2017/163984
PCT Pub. Date: Sep. 28, 2017

(65) Prior Publication Data
US 2018/0133648 A1 May 17, 2018

(30) Foreign Application Priority Data
Mar. 24, 2016 (JP) ................................ 2016-060430

(51) Int. Cl.
F01N 3/10 (2006.01)
B01D 53/94 (2006.01)
(Continued)

(52) U.S. Cl.
CPC .............. B01D 53/94 (2013.01); B01J 35/04 (2013.01); F01N 3/2839 (2013.01);
(Continued)

(58) Field of Classification Search
CPC . F01N 3/0222; B01D 46/247; B01D 46/2451; B01D 46/2425; B01D 2046/2437
(Continued)

(56) References Cited

U.S. PATENT DOCUMENTS 6,120,747 A * 9/2000 Sugishima ......... B01D 53/8659
423/240 S
8,530,030 B2 * 9/2013 Noguchi .............. B01D 46/247
219/553

(Continued)

FOREIGN PATENT DOCUMENTS

JP 2004-105792 A 4/2004
JP 2005-152774 A 6/2005
(Continued)

OTHER PUBLICATIONS

May 23, 2017 International Search Report issued in International Patent Application No. PCT/JP2017/010010.
Dec. 12, 2017 Office Action issued in U.S. Appl. No. 15/285,635.

Primary Examiner — Tom P Duong
(74) Attorney, Agent, or Firm — Oliff PLC

(57) ABSTRACT

An exhaust gas purification device includes: a wall-flow-structured base material having input-side cells, output-side cells, and a porous partition wall; and a catalyst layer formed inside the partition wall contacting the input-side cells or the output-side cells. The catalyst layer is formed in a region extending from the surface of the partition wall and covering at least 90% of the thickness of the partition wall, and is held by the surfaces of the inside pores of the partition wall in the region. Further, the average filling ratios A, B, and C of the catalyst layer held by pores in respective pore size ranges satisfy a specific relationship.

7 Claims, 9 Drawing Sheets

(51) Int. Cl.
*B01J 35/04* (2006.01)
*F01N 3/28* (2006.01)

(52) U.S. Cl.
CPC .. *B01D 2255/50* (2013.01); *B01D 2255/9155* (2013.01); *B01D 2255/9202* (2013.01)

(58) Field of Classification Search
USPC .................................................. 422/177, 180
See application file for complete search history.

(56) References Cited

U.S. PATENT DOCUMENTS

| | | | |
|---|---|---|---|
| 2003/0059359 A1* | 3/2003 | Morita | B01D 53/8662 423/240 S |
| 2004/0053781 A1 | 3/2004 | Okawara | |
| 2005/0042567 A1* | 2/2005 | Sasaki | F23C 13/00 431/328 |
| 2007/0003456 A1 | 1/2007 | Tsuji et al. | |
| 2008/0295469 A1* | 12/2008 | Mizuno | B01D 46/2429 55/479 |
| 2008/0317646 A1 | 12/2008 | Morisaka et al. | |
| 2009/0087365 A1 | 4/2009 | Klingmann et al. | |
| 2009/0238733 A1* | 9/2009 | Ohno | B01D 46/2429 422/180 |
| 2010/0184589 A1 | 7/2010 | Miyairi et al. | |
| 2010/0257843 A1 | 10/2010 | Hoke et al. | |
| 2013/0236687 A1* | 9/2013 | Hirose | B01J 35/002 428/116 |
| 2015/0152768 A1 | 6/2015 | Arulraj et al. | |

FOREIGN PATENT DOCUMENTS

| | | |
|---|---|---|
| JP | 2005-224666 A | 8/2005 |
| JP | 2007-185571 A | 7/2007 |
| JP | 2009-082915 A | 4/2009 |
| JP | 2009-106926 A | 5/2009 |
| JP | 2009-160547 A | 7/2009 |
| JP | 2010-167366 A | 8/2010 |
| JP | 4615263 B2 | 1/2011 |
| JP | 2011-194342 A | 10/2011 |
| JP | 2012-523313 A | 10/2012 |
| WO | 2015/082892 A2 | 6/2015 |

* cited by examiner

× 200

× 200

× 200

10,022,671 B2

EXHAUST GAS PURIFICATION DEVICE

TECHNICAL FIELD

The present invention relates to an exhaust gas purification device. Specifically, the present invention relates to an exhaust gas purification device that purifies exhaust gas discharged from an internal combustion engine such as a gasoline engine.

Note that the present international application claims priority based on Japanese Patent Application Laid-open No. 2016-060430 filed on Mar. 24, 2016, the entire contents of which are incorporated herein by reference.

BACKGROUND ART

Generally, it has been known that exhaust gas discharged from internal combustion engines contains particulate matter (PM) mainly composed of carbon, ash made of noncombustible components, or the like and causes air pollution. Therefore, restrictions on the discharge amount of the particulate matter have been strengthened year by year, besides restrictions on the discharge amount of components such as hydrocarbon (HC), carbon oxide (CO), and nitrogen oxide (NOx) contained in exhaust gas. To this end, technologies for collecting the particulate matter from exhaust gas and removing the same have been proposed.

For example, a particulate filter for collecting the particulate matter is provided inside the exhaust path of an internal combustion engine. For example, since a gasoline engine discharges a certain amount of particulate matter together with exhaust gas although the amount of the particulate matter is smaller than that discharged from a diesel engine, there is a case that a gasoline particulate filter (GPF) is installed in an exhaust path. As such a particulate filter, a so-called wall-flow-structured particulate filter has been known in which a base material is constituted by a multiplicity of porous cells and the entrances and exits of the multiplicity of cells are alternately closed (Patent Literature 1 and 2). In a wall-flow-type particulate filter, exhaust gas flowing in from the entrances of cells passes through the wall of partitioned porous cells and is discharged to the exits of the cells. Then, particulate matter is collected by pores inside the partition wall while the exhaust gas passes through the wall of the porous cells.

CITATION LIST

Patent Literature

Patent Literature 1: Japanese Patent Application Laid-open No. 2009-82915
Patent Literature 2: Japanese Patent Application Laid-open No. 2007-185571

SUMMARY OF INVENTION

Technical Problem

Meanwhile, in recent years, consideration has been given to making the particulate filter carry a precious metal catalyst to further improve exhaust gas purification performance. For example, Patent Literature 1 describes a filter catalyst in which a palladium layer serving as a precious metal catalyst is arranged inside a partition wall and a rhodium layer is laminated on the outside (surface) of the partition wall. However, since the rhodium layer is formed on the outside of the partition wall according to such a technology, a pressure loss increases with an increase in flow path resistance where exhaust gas passes through the cells of a filter. As a result, there is a likelihood of engine performance or the like being adversely affected. The pressure loss is desirably reduced to a greater extent to prevent harmful effects such as poor fuel economy and engine trouble. Further, Patent Literature 2 describes a filter catalyst in which a platinum layer serving as a precious metal catalyst and a rhodium layer are separately carried by the inside pores of a partition wall. However, even if the platinum and rhodium catalyst layers are only arranged inside the pores without any idea like this official gazette, the use efficiency of platinum and rhodium is poor and thus a further improvement in purification performance as described above cannot be substantially realized.

The present invention has been made in view of the above circumstances and has a primary object of providing an exhaust gas purification device having a wall-flow-structured filter catalyst, the exhaust gas purification device being capable of realizing a further improvement in purification performance while reducing a pressure loss.

Solution to Problem

As a result of intensive studies to solve the above problem, the present inventor has found that exhaust gas purification performance is improved when a catalyst layer is preferentially arranged in large pores having a relatively large pore size among the inside pores of a partition wall and that the exhaust gas purification performance can be effectively improved without an increase in pressure loss when the catalyst layer is arranged in a prescribed region in the thickness direction of the partition wall in an exhaust gas purification device having a wall-flow-structured filter catalyst in which the catalyst layer is formed in the inside pores of the partition wall. Thus, the present inventor has completed the present invention.

That is, the present invention provides an exhaust gas purification device that is arranged in an exhaust path of an internal combustion engine and purifies exhaust gas discharged from the internal combustion engine. The device includes: a wall-flow-structured base material having input-side cells in each of which only an end on an exhaust-gas inflow side is opened, output-side cells which are arranged adjacent to the input-side cells and in each of which only an end on an exhaust-gas outflow side is opened, and a porous partition wall that partitions the input-side cells and the output-side cells; and a catalyst layer formed inside the partition wall. The catalyst layer is formed in a region that extends from a surface of the partition wall contacting the input-side cells or the output-side cells and that covers at least 90% of a thickness of the partition wall, the catalyst layer being held by surfaces of inside pores of the partition wall in the region. Further, a relationship among an average filling ratio A of the catalyst layer held by pores having a pore size of 5 μm or more and less than 10 μm, an average filling ratio B of the catalyst layer held by pores having a pore size of 10 μm or more and less than 20 μm, and an average filling ratio C of the catalyst layer held by pores having a pore size of 20 μm or more and less than 30 μm among the inside pores of the partition wall in which the catalyst layer is held, satisfies a following expression $A<B<C$. The exhaust gas purification device having the above configuration can effectively improve exhaust gas purification performance while reducing a pressure loss.

In a preferred embodiment of the exhaust gas purification device disclosed herein, following expressions $0.9 \leq P_{10}/P_{50} \leq 1.1$ and $0.9 \leq P_{90}/P_{50} \leq 1.1$ are satisfied when pressure losses obtained by cutting out a part corresponding to 10%, 50%, and 90% of a length of the base material from the end on the exhaust gas inflow side to a downstream side of the base material and causing gas to flow through the part are assumed as $P_{10}$, $P_{50}$, and $P_{90}$, respectively. When the ratios of pressure losses fall within such ranges, a reduction in pressure loss and catalyst purification performance can be achieved at a higher level.

In a preferred embodiment of the exhaust gas purification device disclosed herein, the average filling ratio C of the catalyst layer held by the pores having a pore size of 20 μm or more and less than 30 μm is larger by 5% or more than the average filling ratio B of the catalyst layer held by the pores having a pore size of 10 μm or more and less than 20 μm. When a larger amount of the catalyst layer is arranged in such large pores having a pore size of 20 μm or more and less than 30 μm, exhaust gas flowing in the pores of the partition wall can be efficiently purified. Therefore, the effect described above can be more excellently produced.

In a preferred embodiment of the exhaust gas purification device disclosed herein, the average filling ratio B of the catalyst layer held by the pores having a pore size of 10 μm or more and less than 20 μm is larger by 5% or more than the average filling ratio A of the catalyst layer held by the pores having a pore size of 5 μm or more and less than 10 μm. In this manner, exhaust gas flowing in the inside pores of the partition wall can be more efficiently purified.

In a preferred embodiment of the exhaust gas purification device disclosed herein, the average filling ratio A is 75% or less, the average filling ratio B is larger than 75% and smaller than 85%, and the average filling ratio C is 85% or more. Thus, the average filling ratios within the ranges are made different from each other according to each pore size range, whereby the most preferable exhaust gas purification device with its exhaust gas purification performance further improved can be obtained.

In a preferred embodiment of the exhaust gas purification device disclosed herein, an average filling ratio D of the catalyst layer held by pores having a pore size of 30 μm or more among the inside pores of the partition wall is smaller than the average filling ratio C of the catalyst layer held by the pores having a pore size of 20 μm or more and less than 30 μm. Preferably, the relationship among the average filling ratios A, B, C, and D satisfies the following expression $D<A<B<C$. Thus, the average filling ratio D of the catalyst layer held by large pores having a pore size of 30 μm or more is made smaller than the average filling ratio C of the catalyst layer held by the pores having a pore size of 20 μm or more and less than 30 μm, whereby the above effect can be obtained without excessively increasing a pressure loss.

In a preferred embodiment of the exhaust gas purification device disclosed herein, the internal combustion engine is a gasoline engine. The temperature of exhaust gas from the gasoline engine is relatively high, and thus PM is hardly deposited inside the partition wall. Therefore, when the internal combustion engine is the gasoline engine, the effect described above is more effectively exhibited.

DESCRIPTION OF EMBODIMENTS

Hereinafter, a description will be given of preferred embodiments of the present invention based on the drawings. Note that matters other than matters particularly mentioned in the present specification and necessary for carrying out the present invention (for example, a general matter such as the arrangement of a particulate filter in an automobile) can be grasped as design matters for skilled persons based on conventional technologies in the field concerned. The present invention can be carried out based on contents disclosed in the present specification and technological knowledges in the field concerned.

Figure 1:
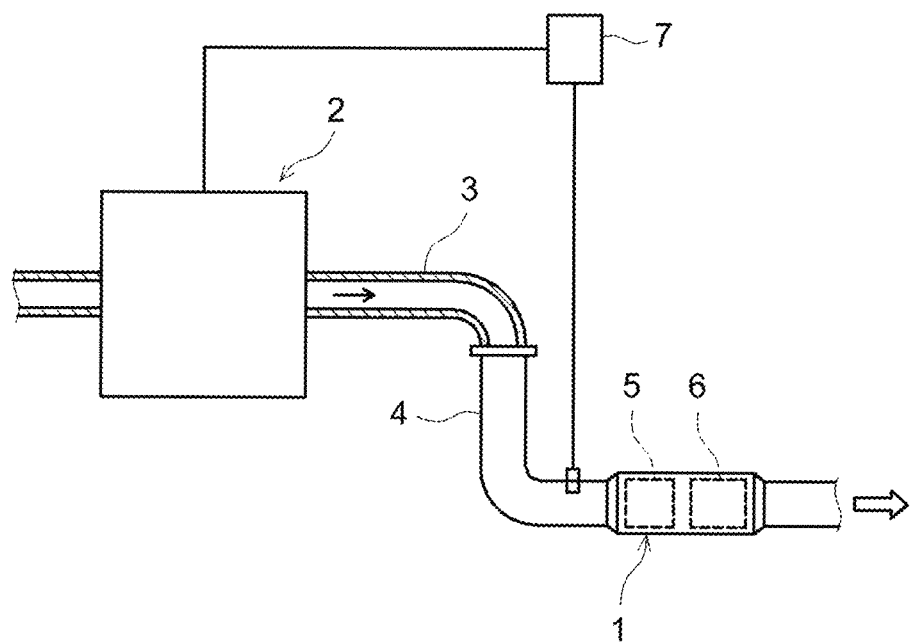
FIG. 1 is a view schematically showing an exhaust gas purification device according to an embodiment.

First, a description will be given of the configuration of an exhaust gas purification device according to an embodiment of the present invention with reference to FIG. 1. An exhaust gas purification device 1 disclosed herein is provided in the exhaust system of an internal combustion engine. FIG. 1 is a view schematically showing an internal combustion engine 2 and the exhaust gas purification device 1 provided in the exhaust system of the internal combustion engine 2.

A mixture containing oxygen and fuel gas is supplied to the internal combustion engine (engine) according to the present embodiment. The internal combustion engine burns the mixture and converts burning energy into mechanical energy. The mixture burned at this time is discharged to the exhaust system as exhaust gas. The internal combustion engine 2 having a configuration shown in FIG. 1 is constituted mainly by the gasoline engine of an automobile.

A description will be given of the exhaust system of the engine 2. An exhaust port (not shown) that makes the engine 2 communicate with the exhaust system is connected to an exhaust manifold 3. The exhaust manifold 3 is connected to an exhaust pipe 4 in which exhaust gas circulates. An exhaust path according to the present embodiment is formed by the exhaust manifold 3 and the exhaust pipe 4. An arrow in the figure indicates an exhaust gas circulation direction.

The exhaust gas purification device 1 disclosed herein is provided in the exhaust system of the engine 2. The exhaust gas purification device 1 has a catalyst portion 5, a filter portion 6, and an ECU 7, and collects particulate matter (PM) contained in exhaust gas while purifying harmful components (for example, carbon monoxide (CO), hydrocarbon (HC), and nitrogen oxide (NO$_x$)) contained in the discharged exhaust gas.

The catalyst portion 5 is configured to be capable of purifying three-way components (NOx, HC, and CO) contained in exhaust gas, and is provided in the exhaust pipe 4 communicating with the engine 2. Specifically, the catalyst portion 5 is provided on the downstream side of the exhaust pipe 4 as shown in FIG. 1. The type of the catalyst portion 5 is not particularly limited. The catalyst portion 5 may be, for example, a catalyst on which precious metal such as platinum (Pt), palladium (Pd), and rhodium (Rh) is carried. Note that a downstream-side catalyst portion may be further arranged in the exhaust pipe 4 on the downstream side of the filter portion 6. Since the specific configuration of the catalyst portion 5 does not characterize the present invention, its detailed description will be omitted.

The filter portion 6 is provided on the downstream side of the catalyst portion 5. The filter portion 6 has a gasoline particulate filter (GPF) capable of collecting and removing particulate matter (hereinafter simply called "PM") contained in exhaust gas. Hereinafter, a description will be given in detail of a particulate filter according to the present embodiment.

Figure 2:
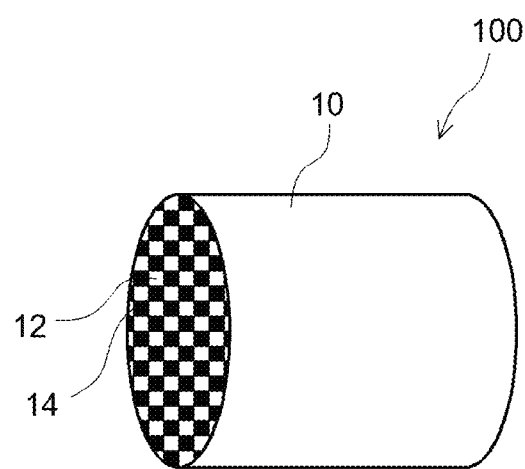
FIG. 2 is a perspective view schematically showing the filter of the exhaust gas purification device according to the embodiment.
Figure 3:
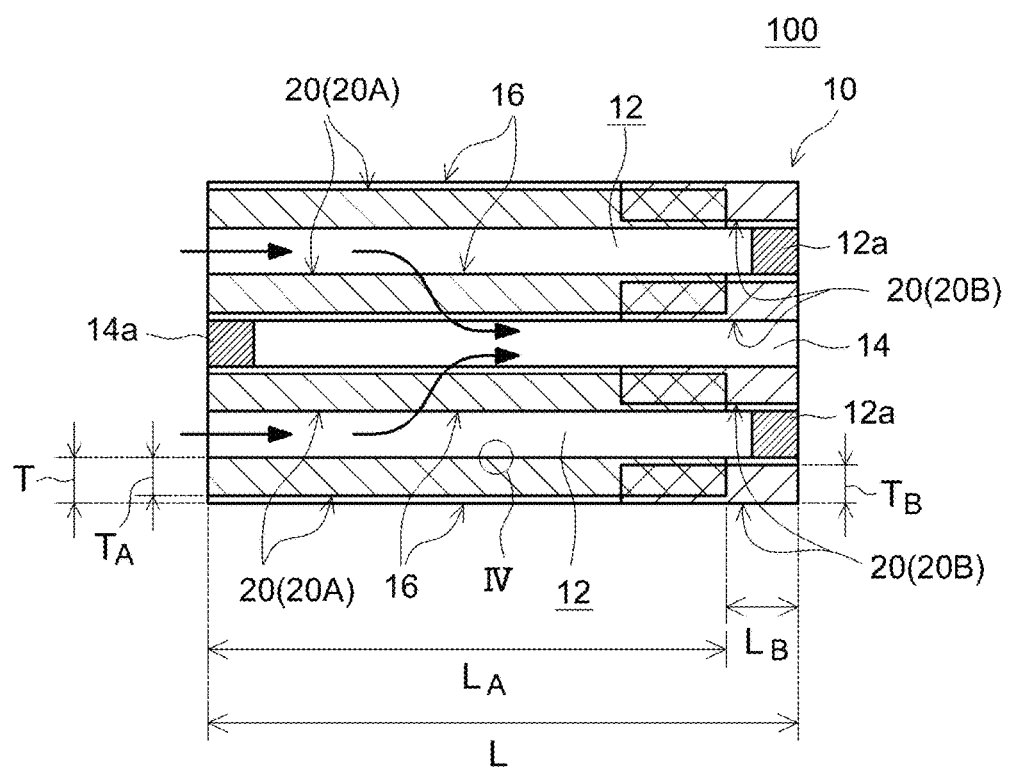
FIG. 3 is a cross-sectional view schematically showing the cross section of the filter of the exhaust gas purification device according to the embodiment.
Figure 4:
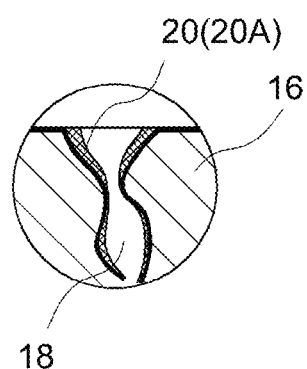
FIG. 4 is a schematic view of a cross section in which a IV region in FIG. 3 is enlarged.

FIG. 2 is a perspective view of a particulate filter 100. FIG. 3 is a schematic view in which a part of a cross section obtained by cutting out the particulate filter 100 in an axis direction is enlarged. FIG. 4 is an enlarged schematic view in which a IV region in FIG. 3 is enlarged. As shown in FIG. 2 to FIG. 4, the particulate filter 100 has a wall-flow-structured base material 10 and a catalyst layer 20. Hereinafter, the base material 10 and the catalyst layer 20 will be described in this order.

<Base Material 10>

As the base material 10, it is possible to use any of base materials having various materials and shapes conventionally used for this purpose. For example, a base material made of ceramics such as cordierite and silicon carbide (SiC) or an alloy (such as stainless steel) can be suitably employed. As an example, a base material having a cylindrical outer shape (present embodiment) is exemplified. However, the base material may have, as its entire outer shape, an elliptic cylindrical shape or a polygonal cylindrical shape instead of a cylindrical shape. The base material 10 has input-side cells 12 in each of which only an end on an exhaust-gas inflow side is opened, output-side cells 14 which are arranged adjacent to the input-side cells 12 and in each of which only an end on an exhaust-gas outflow side is opened, and a porous partition wall 16 that partitions the input-side cells 12 and the output-side cells 14.

<Input-Side Cells 12 and Output-Side Cells 14>

In each of the input-side cells 12, only an end on the exhaust-gas inflow side is opened, and the output-side cells 14 are arranged adjacent to the input-side cells 12 and only an end thereof on the exhaust-gas outflow side is opened. In the present embodiment, the ends of the input-side cells 12 on the exhaust-gas outflow side are sealed by sealing portions 12a, and the ends of the output-side cells 14 on the exhaust-gas inflow side are sealed by sealing portions 14a. The input-side cells 12 and the output-side cells 14 may be set to have an appropriate shape and a size in consideration of the flow rate or the components of exhaust gas supplied to the filter 100. The input-side cells 12 and the output-side cells 14 may have, for example, a rectangular shape such as a square, a parallelogram, a rectangle, and a trapezoid, a triangular shape, other polygonal shapes (for example, a hexagon and an octagon), or various geometric shapes such as a circle. Further, the cross-sectional area (the area of a cross section orthogonal to the length direction of the base material) of the input-side cells 12 and the cross-sectional area (the area of a cross section orthogonal to the length direction of the base material) of the output-side cells 14 may be structured to be the same or different from each other (HAC: High Ash Capacity).

<Partition Wall 16>

The partition wall 16 is formed between the input-side cells 12 and the output-side cells 14 arranged adjacent to each other. The input-side cells 12 and the output-side cells 14 are partitioned by the partition wall 16. The partition wall 16 has a porous structure that allows exhaust gas to pass through. The porosity of the partition wall 16 is not particularly limited, but is approximately substantially 40% to 70% and preferably 55% to 65%. A pressure loss is likely to increase when the porosity of the partition wall 16 is too small, while the mechanical strength of the filter 100 is likely to lower when the porosity of the partition wall 16 is too large. Therefore, the too small and large porosities are not preferable. The above porosities of the partition wall 16 are also preferable from the viewpoint of preferentially arranging slurry that will be described later in the large pores of the partition wall 16. Further, the average pore size of the partition wall 16 is not particularly limited, but is substantially 5 μm to 30 μm and preferably 10 μm to 25 μm from the viewpoint of PM collection efficiency, reducing an increase in pressure loss, or the like. The above average pore size of the partition wall 16 is also preferable from the viewpoint of preferentially arranging the slurry that will be described later in the large pores of the partition wall 16. The thickness of the partition wall 16 is not particularly limited, but may be substantially about 0.2 mm to 1.6 mm. When the thickness of the partition wall falls within such a thickness range, the effect of reducing an increase in pressure loss without impairing the PM collection efficiency is obtained. The thickness of the partition wall 16 is also preferable from the viewpoint of preferentially arranging the slurry that will be described later in the large pores of the partition wall 16.

<Catalyst Layer 20>

In the present embodiment, the catalyst layer 20 has an upstream-side catalyst layer 20A including the end of the base material 10 on the exhaust gas inflow side and arranged at an upstream-side part in an exhaust gas circulation direction, and has a downstream-side catalyst layer 20B including the end of the base material 10 on the exhaust gas outflow side and arranged at a downstream-side part in the exhaust gas circulation direction.

The upstream-side catalyst layer 20A is formed in a region that extends from the surface of the partition wall 16 contacting the input-side cells 12 to the side of the output-side cells 14 in the thickness direction of the partition wall 16 and that covers at least 90% of the thickness T of the partition wall 16 (i.e., $T_A$=0.9T to 1T, preferably 95% to 100%, i.e., $T_A$=0.95T to 1 T). Further, the downstream-side catalyst layer 20B is formed in a region that extends from the surface of the partition wall 16 contacting the output-side cells 14 to the side of the input-side cells 12 in the thickness direction of the partition wall 16 and that covers at least 90% of the thickness T of the partition wall 16 (i.e., $T_B$=0.9T to 1 T, preferably 95% to 100%, i.e., 0.95T to T). In other words, both the upstream-side catalyst layer 20A and the downstream-side catalyst layer 20B are formed in the regions extending from the surface of the partition wall 16 contacting the input-side cells 12 or the output-side cells 14, and covering at least 90% of the thickness T of the partition wall 16 (0.9T≤$T_A$ and 0.9T≤$T_B$). As described above, the catalyst layer 20 is formed in the region corresponding to at least 90% of the thickness T of the partition wall 16, whereby exhaust-gas purification performance can be effectively improved without increasing a pressure loss compared with a conventional filter in which the relationships of $0.9T \leq T_A$ and $0.9T \leq T_B$ are not satisfied.

In the present embodiment, the upstream-side catalyst layer 20A is formed in a part $L_A$ corresponding to at least 80% of an entire length L of the base material 10 from the end on the exhaust-gas inflow side of the base material 10 to the downstream side (for example, 80% to 100%, i.e., $L_A$=0.8L to 1L, preferably 90% to 100%, i.e., $L_A$=0.9L to 1L). Further, the downstream-side catalyst layer 20B is formed in a part $L_B$ corresponding to at most 40% of the entire length L of the base material 10 from the end on the exhaust-gas outflow side of the base material 10 to the upstream side (for example, 0% to 40% (i.e., $L_B$=0L to 0.4L, typically 10% to 30%, i.e., $L_B$=0.1 L to 0.3L)). The downstream-side catalyst layer 20B may be formed to overlap with the upstream-side catalyst layer 20A (i.e., $L < L_A + L_B$) or may be formed not to overlap with the upstream-side catalyst layer 20A (i.e., $L_A + L_B \leq L$) in the length direction (axis direction) of the base material. Note that since the upstream-side catalyst layer 20A and the downstream-side catalyst layer 20B have the same configuration except for their arrangement places inside the partition wall 16, each of the upstream-side catalyst layer 20A and the downstream-side catalyst layer 20B will be collectively described as the catalyst layer 20 below.

As shown in FIG. 4, the catalyst layer 20 is provided inside the partition wall 16. More specifically, the catalyst layer 20 is held by the wall surfaces of inside pores 18 of the partition wall 16.

The particulate filter 100 disclosed herein is such that the relationship among an average filling ratio A of the catalyst layer 20 held by pores having a pore size of 5 μm or more and less than 10 μm, an average filling ratio B of the catalyst layer 20 held by pores having a pore size of 10 μm or more and less than 20 μm, and an average filling ratio C of the catalyst layer 20 held by pores having a pore size of 20 μm or more and less than 30 μm among the inside pores in which the catalyst layer 20 of the partition wall 16 is held in the region of the partition wall 16 in which the catalyst layer 20 is formed satisfies the following expression A<B<C. As described above, the average filling ratios of the catalyst layer held by large pores having a relatively large pore size is made larger than those of the catalyst layer held by small pores having a relatively small pore size, whereby the exhaust gas purification performance can be effectively improved. A reason for producing such an effect is not particularly limited but is assumed as follows, for example. That is, the large pores having a relatively large pore size have a larger flow path for exhaust gas and cause a larger amount of the exhaust gas to flow than the small pores having a relatively small pore size. Therefore, the catalyst layer is preferentially arranged in the large pores causing a larger amount of the exhaust gas to flow, whereby the contact opportunity between the catalyst layer and the exhaust gas increases compared with a conventional embodiment in which the catalyst layer is uniformly arranged in the large pores and the small pores and the exhaust gas is efficiently purified. It is presumed that the above reason contributes to the improvement in the purification performance.

The average filling ratio C of the catalyst layer held by the pores having a pore size of 20 μm or more and less than 30 μm is only required to be larger than the average filling ratio B of the catalyst layer held by the pores having a pore size of 10 μm or more and less than 20 μm, and is not particularly limited. For example, the average filling ratio C of the catalyst layer held by the pores having a pore size of 20 μm or more and less than 30 μm is preferably larger by 2% or more and more preferably 3% or more than the average filling ratio B of the catalyst layer held by the pores having a pore size of 10 μm or more and less than 20 μm. The exhaust gas purification device disclosed herein can be preferably carried out, for example, in an embodiment in which the average filling ratio C is larger by 5% or more than the average filling ratio B. Thus, the exhaust gas purification performance can be more excellently realized. Further, a value obtained by subtracting the average filling ratio B from the average filling ratio C (i.e., C–B) is preferably 60% or less, more preferably 50% or less, and still more preferably 40% or less. For example, the value of C–B may be 30% or less, 20% or less, or 10% or less. A specific example of the average filling ratio C is preferably 80% or more and more preferably 85% or more from the viewpoint of more excellently exhibiting the effect produced by making the average filling ratio C larger than the average filling ratios A and B (the effect of improving the exhaust gas purification performance) or the like. The upper limit of the average filling ratio C is not particularly limited, but the average filling ratio C is substantially 95% or less and preferably 90% or less from the viewpoint of reducing an increase in pressure loss or the like.

The average filling ratio B of the catalyst layer held by the pores having a pore size of 10 μm or more and less than 20 μm is only required to be larger than the average filling ratio A of the catalyst layer held by the pores having a pore size of 5 μm or more and less than 10 μm, and is not particularly limited. For example, the average filling ratio B of the catalyst layer held by the pores having a pore size of 10 μm or more and less than 20 μm is preferably larger by 2% or more and more preferably 3% or more than the average filling ratio A of the catalyst layer held by the pores having a pore size of 5 μm or more and less than 10 μm. Thus, the exhaust gas purification performance can be more excellently realized. For example, the average filling ratio B may be larger by 5% or more and typically 6% or more than the average filling ratio A. Further, a value obtained by subtracting the average filling ratio A from the average filling ratio B (i.e., B–A) is preferably 40% or less, more preferably 30% or less, and still more preferably 25% or less. For example, the value of B–A may be 20% or less and typically 10% or less. A specific example of the average filling ratio B is preferably 45% or more, more preferably 50% or more, for example 65% or more, and typically 70% or more from the viewpoint of more excellently exhibiting the effect produced by making the average filling ratio B larger than the average filling ratio A (the effect of improving the exhaust gas purification performance) or the like. The exhaust gas purification device disclosed herein can be preferably carried out, for example, in an embodiment in which the average filling ratio B is 75% or more and typically larger than 75%. The upper limit of the average filling ratio B is not particularly limited, but the average filling ratio B is substantially 90% or less, preferably 85% or less, and typically smaller than 85% from the viewpoint of reducing an increase in pressure loss or the like.

The average filling ratio A of the catalyst layer held by the pores having a pore size of 5 μm or more and less than 10 μm is not particularly limited so long as the relationship A<B<C is satisfied between the average filling ratio A and the average filling ratios B and C but is preferably 30% or more, more preferably 40% or more, for example 45% or more, and typically 50% or more from the viewpoint of improving the exhaust gas purification performance. The exhaust gas purification device disclosed herein can be carried out, for example, in an embodiment in which the average filling ratio A is 55% or more and typically 60% or more. The upper limit of the average filling ratio A is not particularly limited, but the average filling ratio A is substantially 80% or less and preferably 75% or less (for example, smaller than 75%) from the viewpoint of reducing an increase in pressure loss or the like.

In a preferred embodiment of the technology disclosed herein, an average filling ratio D of the catalyst layer 20 held by pores having a particle size of 30 µm or more is smaller than the average filling ratio C of the catalyst layer held by the pores having a pore size of 20 µm or more and less than 30 µm among the inside pores in which the catalyst layer 20 of the partition wall 16 is held. In a preferred embodiment, the relationship among the average filling ratios A, B, C, and D satisfies the following expression D<A<B<C. As described above, the average filling ratio D of the catalyst layer held by the large pores having a pore size of 30 µm or more is made smaller than the average filling ratio C of the catalyst layer held by the pores having a pore size of 20 µm or more and less than 30 µm, whereby the above effect (for example, the effect of improving the exhaust gas purification performance) can be obtained without excessively increasing a pressure loss. For example, the average filling ratio D of the catalyst layer 20 held by the pores having a pore size of 30 µm or more is preferably smaller by 5% or more and more preferably 10% or more than the average filling ratio C of the catalyst layer held by the pores having a pore size of 20 µm or more and less than 30 µm. Thus, both the reduction in pressure loss and the improvement in the purification performance can be achieved at a higher level. For example, the average filling ratio D may be smaller by 20% or more or 30% or more than the average filling ratio C. Further, a value obtained by subtracting the average filling ratio D from the average filling ratio C (i.e., C−D) is preferably 60% or less and more preferably 50% or less. A specific example of the average filling ratio D is preferably 30% or more and more preferably 40% or more from the viewpoint of improving the exhaust gas purification performance. The exhaust gas purification device disclosed herein can be preferably carried out, for example, in an embodiment in which the average filling ratio D is 45% or more. The upper limit of the average filling ratio D is not particularly limited, but the average filling ratio D is substantially 85% or less and preferably 70% or less from the viewpoint of reducing an increase in pressure loss or the like. The average filling ratio D may be, for example, 60% or less and typically 50% or less.

Note that in the present specification, the pore sizes of the pores provided inside the partition wall and the filling ratios of the catalyst layer held by the pores are calculated as follows.

(1) The inside pores of the partition wall included in an SEM image of a cross section or a TEM image of the cross section in which the catalyst layer is held are observed using a scanning electron microscope (SEM) or a transmission electron microscope (TEM), and pores are separated from a region from which pores having the largest pore size are extracted in the image.

(2) If the pores are connected to each other, they are partitioned when the sizes of diameters reduce to 50% of the maximum pore size and separated as single pores (the catalyst layer is treated as the pores at this time).

(3) Then, the diameter of an ideal circle (true circle) having the same area as an area X of the pores calculated from the separated pore image is calculated as the pore size of the pores.

(4) Further, an area Y of the catalyst layer held inside the pores is calculated from the separated pore image, and the percentage of a value obtained by dividing the area Y of the catalyst layer by the area X of the pores (i.e., 100× Y/X) is calculated as the filling ratio (%) of the catalyst layer.

(5) Pores having the second largest pore size after the pores separated in the above process (1) are separated.

After that, the processes (2) to (5) are repeatedly performed until pores having a pore size of 5 µm or less are separated, whereby the pore size of the pores provided inside the partition wall and the filling ratios of the catalyst layer held by the pores can be calculated. Then, the arithmetic mean of the filling ratio of the catalyst layer for each pore size range is calculated, whereby the average filling ratio of the catalyst layer for each pore size range can be derived. Note that the pore size of each pore and the filling ratios of the catalyst layer can be calculated using image analysis software based on a computer that performs prescribed processing according to a prescribed program.

<Coating Amount of Catalyst Layer>

The coating amount of the catalyst layer is not particularly limited so long as the average filling ratios A, B, and C in respective pore size ranges and the forming regions $T_A$ and $T_B$ inside the partition wall satisfy the above relationships, but is substantially 300 g/L or less, preferably 250 g/L or less, for example 150 g/L or less, and typically less than 100 g/L per liter of the base material. For example, the coating amount of the catalyst layer may be 80 g/L or less and typically 65 g/L or less. According to the present configuration, the average filling ratios of the catalyst layer held by large pores having a large pore size is made larger than those of the catalyst layer held by small pores having a small pore size, whereby the exhaust gas purification performance can be effectively improved while the coating amount of the catalyst layer is reduced in the entire filter (and thus a reduction in pressure loss and cost reduction are achieved). Accordingly, even if the catalyst layer is coated by, for example, a small amount of 300 g/L or less (for example, less than 100 g/L and typically 65 g/L or less) per liter of the base material, the exhaust gas purification device that is excellent in the purification performance and provides high performance (for example, an increase in pressure loss is not caused when exhaust gas passes through the base material) can be realized. The lower limit of the coating amount of the catalyst layer is not particularly limited, but is preferably 30 g/L or more, more preferably 40 g/L or more, and still more preferably 50 g/L or more from the viewpoint of improving the purification performance or the like.

Note that a state in which "the catalyst layer is held by the inside pores of the partition wall" in the present specification indicates that the catalyst layer mainly exists inside the partition wall (exists on the wall surfaces of the inside pores) rather than existing on the surface (i.e., the outside) of the partition wall. More specifically, it is assumed that the cross section of the base material is, for example, observed by an electron microscope and the ratio of the entire coating amount of the catalyst layer is 100%. At this time, in the above state, the coating amount of the catalyst layer existing on the wall surfaces of the inside pores of the partition wall is typically 80% or more (for example, 90% or more), for example 95% or more, preferably 98% or more, still more preferably 99% or more, and particularly substantially 100%

(i.e., the catalyst layer does not substantially exist on the surface of the partition wall). Accordingly, the state is definitely different from a state in which part of the catalyst layer unintentionally permeates the inside pores of the partition wall, for example, when the catalyst layer is arranged on the surface of the partition wall.

A catalyst contained in the catalyst layer 20 is not particularly limited so long as the average filling ratios A, B, and C in respective pore size ranges and the forming regions $T_A$ and $T_B$ inside the partition wall satisfy the above relationships. The catalyst can be, for example, a SCR catalyst, a three-way catalyst, an NSR catalyst, or a catalyst in which these catalysts are combined together.

<SCR Catalyst>

The catalyst layer 20 can be, for example, a layer containing a SCR (Selective Catalytic Reduction) catalyst. That is, the filter is configured to carry the SCR catalyst to purify nitrogen oxide (NOx) in exhaust gas. The SCR catalyst is not particularly limited, but examples of the SCR catalyst include β-type zeolite and SAPO (silicoaluminophosphate)-based zeolite. As SAPO, SAPO-5, SAPO-11, SAPO-14, SAPO-17, SAPO-18, SAPO-34, SAPO-39, SAPO-42, SAPO-47, or the like is exemplified. The SCR catalyst may contain any metal component. As such a metal component, copper (Cu), iron (Fe), sodium (Na), potassium (K), magnesium (Mg), calcium (Ca), cobalt (Co), nickel (Ni), zinc (Zn), silver (Ag), lead (Pb), vanadium (V), chromium (Cr), molybdenum (Mo), yttrium (Y), cerium (Ce), neodymium (Nd), tungsten (W), indium (In), iridium (Ir), or the like is exemplified. With the above metal contained in the SAPO, NOx can be more efficiently purified. When the catalyst layer 20 contains the SCR catalyst, reducing-agent solution supply means for supplying a reducing-agent solution (for example, urea water) to generate ammonia may be arranged on the upstream side of the exhaust pipe with respect to the particulate filter 100.

<Precious Metal>

The catalyst layer 20 can be a layer containing a three-way catalyst. That is, the catalyst layer 20 may contain precious metal and a carrier carrying the precious metal. The precious metal contained in the catalyst layer 20 is only required to have a catalytic function for harmful components contained in exhaust gas. As the precious metal, palladium (Pd), rhodium (Rh), platinum (Pt), ruthenium (Ru), iridium (Ir), osmium (Os), or the like can be used.

<Carrier>

The precious metal is carried by a carrier (typically powder). Examples of the carrier carrying the precious metal include a metal oxide such as alumina ($Al_2O_3$), zirconia ($ZrO_2$), ceria ($CeO_2$), silica ($SiO_2$), magnesia (MgO), and titanium oxide (titania: $TiO_2$) or a solid solution (for example, a ceria-zirconia ($CeO_2$—$ZrO_2$) multiple oxide) in which these components are mixed together. Among these components, the alumina and/or the ceria-zirconia multiple oxide are/is preferably used. Two or more types of these components may be used in combination. Note that other materials (typically inorganic oxides) may be added to the carrier as accessory components. As a substance that can be added to the carrier, a rare-earth element such as lanthanum (La) and yttrium (Y), an alkaline earth element such as calcium, other transition metal elements, or the like can be used. Among the above components, the rare-earth element such as lanthanum and yttrium is suitably used as a stabilizing agent since it can improve specific surface area at a high temperature without inhibiting the catalytic function.

The carrying amount of the precious metal in the carrier is not particularly limited, but is appropriately in the range of 0.01% by mass to 2% by mass (for example, 0.05% by mass to 1% by mass) with respect to the total mass of the carrier carrying the precious metal of the catalyst layer 20. A method for making the carrier of the catalyst layer 20 carry the precious metal is not particularly limited. For example, carrier powder containing $Al_2O_3$ and/or $CeO_2$—$ZrO_2$ multiple oxide is immersed in a solution containing precious metal salt (for example, nitrate salt) or a precious metal complex (for example, a tetraamine complex) and then dried and burned to be prepared.

The catalyst layer 20 may contain a NOx absorption material having NOx occlusion performance besides the precious metal and the carrier. The NOx occlusion material is only required to have NOx occlusion performance by which NOx in exhaust gas is absorbed when the air-fuel ratio of the exhaust gas is put in a lean state in which oxygen is excessive and the absorbed NOx is released when the air-fuel ratio is switched to a rich side. As such a NOx absorption material, a basic material containing one or two or more types of metal that can supply electrons to NOx can be preferably used. Examples of the NOx absorption material include alkali metal such as potassium (K), sodium (Na), and cesium (Cs), alkali earth metal such as barium (Ba) and calcium (Ca), rare earth such as lanthanides, and metal such as silver (Ag), copper (Cu), iron (Fe), and iridium (Ir). Among these components, a barium compound (for example, barium nitrate) has high NOx occlusion performance and is suitable as the NOx absorption material used in the exhaust gas purification device disclosed herein.

<Method for Forming Catalyst Layer 20>

In forming the catalyst layer 20, catalyst-layer forming slurry containing powder in which precious metal is carried by a carrier and an appropriate solvent (for example, ion-exchanged water) is only required to be prepared.

Here, the viscosity of the slurry is an important factor from the viewpoint of realizing the relationship (A<B<C) of the average filling ratios of the catalyst layer described above. That is, the viscosity of the slurry may be adjusted such that the slurry easily flows in large pores (for example, pores having a pore size of 20 μm or more and less than 30 μm) and hardly flows in small pores (for example, pores having a pore size of 5 μm or more and less than 10 μm) among the inside pores of the partition wall 16. In a preferred embodiment, the viscosity $\eta_{400}$ of the slurry when a shear speed is 400 $s^{-1}$ is 50 mPa·s or less (for example, 1 mPa·s to 50 mPa·s), more preferably 30 mPa·s or less, still more preferably 20 mPa·s or less, and for example 15 mPa·s or less (for example, 1 mPa·s to 15 mPa·s). The slurry is preferentially arranged in large pores among the inside pores of the partition wall 16 when the slurry having the specific viscosity described above is used, and thus the catalyst layer satisfying the relationship (A<B<C) of the average filling ratios can be stably formed. The viscosity is also suitable from the viewpoint of realizing the forming regions (0.9T≤$T_A$ and 0.9T≤$T_B$) inside the partition wall. In order to realize the viscosity of the slurry, the slurry may contain a thickening agent or a dispersing agent. As the thickening agent, a cellulose-based polymer such as carboxymethyl cellulose (CMC), methylcellulose (MC), hydroxypropylmethyl cellulose (HPMC), and hydroxyethylmethyl cellulose (HEMC) is exemplified. The content of the thickening agent occupied in the entire solid content of the slurry is not particularly limited so long as the viscosity of the slurry satisfies the above ranges, but is substantially 10% by mass to 50% by mass, preferably 20% by mass to 40% by mass, and more preferably 25% by mass to 35% by mass. Note that the viscosity of the slurry is viscosity that can be measured by a commercially-available shearing viscometer at room temperature. When a dynamic viscoelasticity measurement device (rheometer) standard in the field concerned is used, the viscosity can be easily measured under the condition of the above shear speed range. Here, the "room temperature" indicates a temperature range of 15° C. to 35° C. and typically a temperature range of 20° C. to 30° C. (for example, 25° C.).

The average particle size of particles (typically, the powder of the carrier carrying the precious metal) in the slurry is not particularly limited, but is preferably about 1/50 to 1/3 of the average pore size (median value: D50 diameter) of the partition wall 16. The average particle size of the particles in the slurry is more preferably about 1/40 to 1/5 and still more preferably about 1/30 to 1/10 of the average pore size of the partition wall 16. When the average pore size of the partition wall 16 is, for example, 15 μm to 20 μm, the average particle size of the particles in the slurry can be 0.3 μm to 3 μm (preferably 0.4 μm to 1 μm and more preferably 0.5 μm to 0.7 μm). When average particle size of the particles in the slurry falls within such ranges, the slurry is easily preferentially arranged in large pores among the inside pores of the partition wall 16. Therefore, the catalyst layer satisfying the relationship (A<B<C) of the average filling ratios can be more stably formed. Note that the average particle size (median value: D50 diameter) of the particles in the slurry can be grasped based on a laser diffraction and scattering method.

In the manufacturing method disclosed herein, the catalyst layer 20 is formed inside the pores of the partition wall 16 using the slurry. The catalyst layer 20 can be formed by an absorption coating method.

Meanwhile, the formation of a catalyst layer is generally performed using an immersion method. In the method, after a base material is immersed in slurry as described above such that the slurry permeates the base material and flows in the pores of a partition wall, the base material is taken out to adjust the amount of the slurry by an air blow and a solvent is volatilized to form the catalyst layer inside the pores of the partition wall. According to the method, the slurry also flows in occluded holes through which exhaust gas does not pass among the pores of a partition wall, and thus the catalyst layer that does not contribute to exhaust gas purification is likely to be formed. Therefore, there is a likelihood that purification performance reduces.

On the other hand, in the absorption coating method disclosed herein, all or part of the slurry is coated on a part (hereinafter called an "end F") serving as an end on the exhaust-gas inflow side or the exhaust-gas outflow side of the base material and absorbed from the other end (i.e., a part serving as the end on the exhaust-gas outflow side or the exhaust-gas inflow side of the base material, hereinafter called an "end R") (the first slurry is input). Specifically, the slurry is absorbed so as to be coated on a part corresponding to at least 80% (for example, 80% to 100% and preferably 80% to 95%) of the length of the base material from the end F to the end R of the base material, and coated on a region extending from the surface of the partition wall and covering at least 90% (for example, 90% to 100% and preferably 95% to 100%) of the thickness of the partition wall. Further, where necessary, the rest of the slurry is coated on the end R of the base material and absorbed so as to be coated on a part corresponding to at most 40% (for example, 5% to 40% and more preferably 5% to 30%) of the length of the base material from the end R to the end F, and coated on a region extending from the surface of the partition wall and covering at least 90% (for example, 90% to 100% and preferably 95% to 100%) of the thickness of the partition wall (second slurry is input). As described above, when the slurry is caused to flow in the pores of the partition wall by absorption, the slurry easily preferentially flows in through-holes through which exhaust gas passes and hardly flows in occluded holes through which the exhaust gas does not pass among the pores of the partition wall. Therefore, the inconvenience of forming the catalyst layer that does not contribute to the purification of the exhaust gas as in the immersion method is solved or reduced, and the purification performance can be improved.

Figure 5:
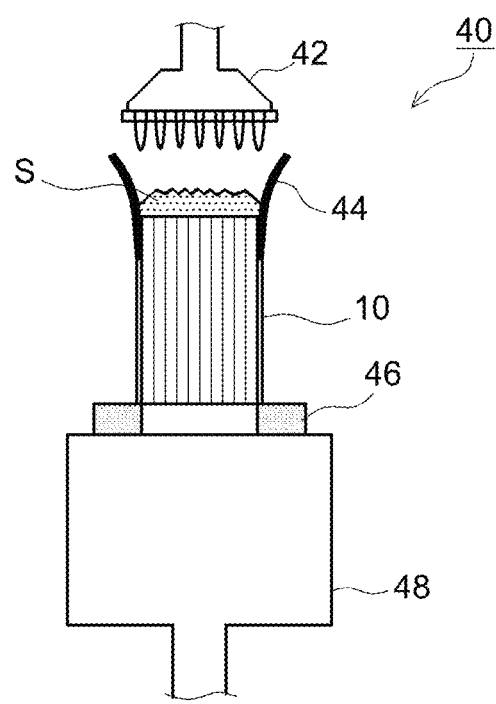
FIG. 5 is a view schematically showing an absorption coating device according to an embodiment.

FIG. 5 is a view schematically showing an absorption coating device 40 according to an embodiment. The absorption coating device 40 shown in FIG. 5 has a lower seat 46, a slurry storage portion 44, a slurry supply portion 42, and an air chamber 48. The lower seat 46 is a portion onto which the base material 10 is fixed (placed).

The slurry storage portion 44 has an attachment attached to the upper end of the base material 10. In the embodiment, the attachment is formed into a cylindrical shape of which lower end has the same size as the outer shape of the base material 10 and of which diameter expands toward the side of an upper end. The lower end of the attachment is fitted in the base material 10. The slurry supply portion 42 is a portion that supplies slurry S to the slurry storage portion 44. In the embodiment, the slurry supply portion 42 has a shower-type nozzle and measures and supplies a prescribed amount of the slurry S to the slurry storage portion 44. The nozzle is not particularly limited so long as it is excellent in measurement, and a nozzle other than the shower-type nozzle can be appropriately employed.

The air chamber 48 is a portion of which internal pressure is controlled by an air pressure control mechanism not shown. In the embodiment, the air chamber 48 is arranged beneath the lower seat 46 and communicates with the base material 10 via an opening opened in the lower seat 46. In performing absorption coating, air inside the air chamber 48 is absorbed by the air pressure control mechanism to generate negative pressure at which the slurry S stored in the slurry storage portion 44 can flow in the base material 10. Thus, the slurry S stored in the slurry storage portion 44 is absorbed into the base material 10.

The absorption speed (wind speed) of the slurry is not particularly limited, but is appropriately substantially 10 m/s to 80 m/s (preferably 10 m/s to 50 m/s and more preferably 15 m/s to 25 m/s). Further, the absorption time of the slurry is not particularly limited, but is appropriately substantially 0.1 second to 10 seconds (preferably 0.5 second to 5 seconds and more preferably 1 second to 2 seconds). As preferred examples of the technology disclosed herein, the absorption speed of the slurry is 10 m/s to 30 m/s and the absorption time of the slurry is 0.5 second to 5 seconds, and the absorption speed of the slurry is 15 m/s to 25 m/s and the absorption time of the slurry is 1 second to 2 seconds. When the absorption speed and the absorption time of the slurry fall within such absorption speeds and absorption times, the slurry is preferentially arranged in large pores among the inside pores of the partition wall 16. Therefore, the catalyst layer satisfying the relationship (A<B<C) of the average filling ratios can be more stably formed.

In the manufacturing method disclosed herein, the slurry flowing in the pores of the partition wall 16 is then dried and burned at a prescribed temperature. Thus, the catalyst layer 20 is held by the wall surfaces of the pores of the partition wall 16. In the manner described above, a particulate filter in which the catalyst layer is formed on the wall surfaces of the pores of the partition wall 16 can be obtained.

The particulate filter thus obtained is one formed by making the slurry having the specific viscosity preferentially flow in the large pores of the partition wall according to the absorption coating method. Accordingly, the catalyst layer satisfying the relationship (A<B<C) of the average filling ratios is stably formed, and the filter excellent in the purification performance can be obtained. Further, in the manufacturing method disclosed herein, the slurry is coated on the end F of the base material and absorbed from the other end R. At this time, the slurry is absorbed so as to be coated on the region extending from the surface of the partition wall and covering at least 90% of the thickness of the partition wall. Further, where necessary, the rest of the slurry is coated on the end R of the base material and absorbed from the other end F. At this time, the slurry is absorbed so as to be coated on the region extending from the surface of the partition wall and covering at least 90% of the thickness of the partition wall. As described above, the slurry is absorbed so as to be coated on the region extending from the surface of the partition wall and covering at least 90% of the thickness of the partition wall, whereby an increase in pressure loss can be reduced to a lower level compared with a conventional filter. Thus, according to the manufacturing method disclosed herein, the filter that generates a lower pressure loss compared with a conventional filter and is excellent in the purification performance can be formed.

Further, according to the manufacturing method disclosed herein, the catalyst layer satisfying the relationship of the average filling ratios can be more uniformly formed (for example, the catalyst layer can be uniformly formed with a small fluctuation in coating amount in the length direction of the base material). Therefore, the obtained filter can be one in which a difference in the pressure loss between places in the length direction of the base material is small. Typically, when pressure losses obtained by cutting out parts corresponding to 10%, 50%, and 90% of the length of the base material from the end on the exhaust gas inflow side to the downstream side of the base material and causing gas to flow through the parts are assumed as $P_{10}$, $P_{50}$, and $P_{90}$, respectively, the value of the ratio of $P_{10}$ to $P_{50}$ can satisfy substantially $0.9 \leq P_{10}/P_{50} \leq 1.1$ (preferably, $0.95 \leq P_{10}/P_{50} \leq 1.05$). Further, the value of the ratio of $P_{90}$ to $P_{50}$ can satisfy substantially $0.9 \leq P_{90}/P_{50} \leq 1.1$ (preferably, $0.95 \leq P_{90}/P_{50} \leq 1.05$). As described above, the catalyst layer satisfying the relationship of the average filling ratios is uniformly formed in the length direction of the base material, whereby the filter having more excellent purification performance compared with a conventional filter can be formed although the coating amount of the catalyst used in the entire filter is the same.

Figure 6:
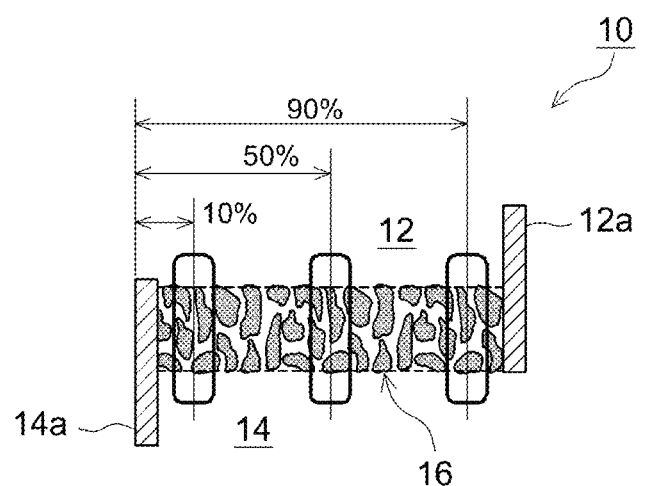
FIG. 6 is a view for describing a method for measuring pressure losses $P_{10}$, $P_{50}$, and $P_{90}$.

Note that the pressure losses $P_{10}$, $P_{50}$, and $P_{90}$ of the base material can be grasped by measuring the pressure losses of a specimen obtained by cutting out a specific part of the base material. Specifically, as shown in FIG. 6, a partition wall 16 of a part corresponding to 10%, 50%, and 90% of the length of the base material 10 is cut out with a width (width along the length direction of the base material) of, for example, 20 mm from the end on the exhaust-gas inflow side to the downstream side of the base material 10 that is to be measured to manufacture a specimen. Then, the specimen is placed in a blower-type pressure loss measurement device, and gas is caused to flow in the radial direction (in the thickness direction of the partition wall 16, i.e., in the direction orthogonal to the length direction of the base material) of the specimen to measure pressure losses from the differences between front and rear static pressures. The flow rate of the gas used in the measurement is set at 200 cc/sec. The measurement of the pressure losses can be performed using, for example, a commercially-available pressure-loss measurement device.

According to the technology disclosed herein, the method for manufacturing the particulate filter in which the catalyst layer satisfying the relationship (A<B<C) of the average filling ratios is provided and the values of the ratios between the pressure losses $P_{10}$, $P_{50}$, and $P_{90}$ of the base material satisfy the expressions $0.9 \leq P_{10}/P_{50} \leq 1.1$ and $0.9 \leq P_{90}/P_{50} \leq 1.1$ can be provided.

The manufacturing method includes: preparing (purchasing, manufacturing, or the like) the wall-flow-structured base material having the input-side cells in each of which only an end on the exhaust-gas inflow side is opened, the output-side cells which are arranged adjacent to the input-side cells and in each of which only an end on the exhaust-gas outflow side is opened, and the porous partition wall that partitions the input-side cells and the output-side cells; coating the catalyst-layer forming slurry on the end F (i.e., the part serving as the end on the exhaust-gas inflow side or the exhaust-gas outflow side) of the base material and absorbing the same from the other end R (i.e., the part serving as the end on the exhaust-gas outflow side or the exhaust-gas inflow side of the base material); and drying and burning the base material into which the slurry is absorbed.

Here, in the above absorption step of the slurry, the slurry is absorbed so as to be coated on the part corresponding to at least 80% of the length of the base material from the end F to the end R of the base material and absorbed so as to be coated on the region extending from the surface of the partition wall and covering at least 90% of the thickness of the partition wall. Further, in a preferred embodiment, the catalyst-layer forming slurry can be set to have a viscosity $\eta_{400}$ of 50 mPa·s or less (for example, 15 mPa·s or less) when a shearing speed is 400 $s^{-1}$.

The filter manufactured according to the method can be suitably used as the particulate filter of the exhaust gas purification device.

In the particulate filter 100, exhaust gas flows in from the input-side cells 12 of the base material 10 as shown in FIG. 3. The exhaust gas flowing in from the input-side cells 12 reaches the output-side cells 14 after passing through the porous partition wall 16. In FIG. 3, routes on which the exhaust gas flowing in from the input-side cells 12 reaches the output-side cells 14 after passing through the partition wall 16 are indicated by arrows. At this time, since the partition wall 16 has a porous structure, particulate matter (PM) is collected by the surface of the partition wall 16 and pores inside the partition wall 16 when the exhaust gas passes through the partition wall 16. Further, since the catalyst layer 20 is provided inside the pores of the partition wall 16 as shown in FIG. 4, harmful components in the exhaust gas is purified when the exhaust gas passes through the pores of the partition wall 16. At this time, the exhaust gas is efficiently purified at the catalyst layer 20 preferentially held by large pores in which a large amount of the exhaust gas flows. The exhaust gas reaching the output-side cells 14 after passing through the partition wall 16 is discharged to the outside of the filter 100 from an opening on the exhaust-gas outflow side.

Test Example 1

Hereinafter, a description will be given of a test example relating to the present invention, but will not intend to limit the present invention to the following test example.

Example 1

Zeolite powder and ion-exchanged water were mixed together to prepare catalyst-layer forming slurry S1. The solid content ratio of the slurry S1 was set at 30% by mass. Further, the slurry S1 had a viscosity $\eta_{400}$ of 15 mPa·s when the shearing speed of the slurry S1 was 400 s$^{-1}$. Next, using the absorption coating device 40 shown in FIG. 5, 600 g of the slurry S1 was coated on the part (end F) serving as the end on the exhaust-gas inflow side of the SiC base material 10 (wall-flow-type base material shown in FIG. 2 and FIG. 3: HAC structure) and then absorbed from the other end R (i.e., the part serving as the end on the exhaust-gas outflow side of the base material 10) to be caused to flow in the pores of the partition wall 16 (first slurry was input). At this time, absorption conditions (absorption speed 20 m/s, absorption time 1 second) were set such that the slurry S1 was coated on the part corresponding to 95% of the length of the base material from the end F to the end R of the base material, and coated on the region extending from the surface of the partition wall and covering 100% of the thickness of the partition wall (i.e., with a coating width of 95% and a coating depth of 100%). After drying and burning the slurry S1, 200 g of the rest of the slurry S1 was coated on the part (end R) serving as the end on the exhaust-gas outflow side of the base material 10 and then absorbed from the other end F (i.e., the part serving as the end on the exhaust-gas inflow side of the base material 10) to be caused to flow in the pores of the partition wall 16 (second slurry was input). At this time, absorption conditions were set such that the slurry S1 was coated on the part corresponding to 30% of the length of the base material from the end R to the end F of the base material, and coated on the region extending from the surface of the partition wall and covering 100% of the thickness of the partition wall (i.e., with a coating width of 30% and a coating depth of 100%). Then, the slurry was dried and burned to form the catalyst layer 20 inside the pores of the partition wall 16. The coating amount of the catalyst layer per liter of the base material was set at 240 g/L. In the manner described above, a particulate filter having the catalyst layer 20 was obtained.

Example 2

Except for changes in the ends (coating ends) on which the slurry was coated and the input amount, the coating width, and the coating depth of the slurry in the input of the first slurry and the second slurry, as indicated in Table 1, a particulate filter was manufactured in the same procedure as that of Example 1.

Comparative Example 1

A particulate filter was manufactured using an immersion method. Specifically, after the base material was immersed in the slurry S1 and the slurry S1 was caused to permeate the base material and flow in the pores of the partition wall, the base material was taken out to adjust the amount of the slurry by an air blow and a solvent was volatilized to form the catalyst layer inside the pores of the partition wall. The wind speed of the air blow was set at 20 m/s, and a blowing time was set at 1 second. The coating amount of the catalyst layer per liter of the base material was set at 240 g/L. Except for the above conditions, a particulate filter was manufactured in the same procedure as that of Example 1.

Comparative Examples 2 and 3

Except for changes in the ends (coating ends) on which the slurry was coated and the input amount, the coating width, and the coating depth of the slurry in the input of the first slurry and the second slurry, as indicated in Table 1, a particulate filter was manufactured in the same procedure as that of Example 1.

TABLE 1

| | | Input of First Slurry | | | | Input of Second Slurry | | | Pressure Loss |
| | Coating Method | Coating End | Input Amount (g) | Coating Width (%) | Coating Depth (%) | Coating End | Input Amount (g) | Coating Width (%) | Coating Depth (%) | Increasing Ratio (%) |
| --- | --- | --- | --- | --- | --- | --- | --- | --- | --- | --- |
| Example 1 | Absorption | Exhaust-Gas Inflow Side | 600 | 95 | 100 | Exhaust-Gas Outflow Side | 200 | 30 | 100 | 125 |
| Example 2 | Absorption | Exhaust-Gas Outflow Side | 600 | 95 | 100 | Exhaust-Gas Inflow Side | 200 | 30 | 100 | 126 |
| Comparative Example 1 | Immersion | — | — | — | 100 | — | — | — | 100 | 125 |
| Comparative Example 2 | Absorption | Exhaust-Gas Inflow Side | 400 | 60 | 52 | Exhaust-Gas Outflow Side | 400 | 60 | 53 | 147 |
| Comparative Example 3 | Absorption | Exhaust-Gas Outflow Side | 400 | 60 | 51 | Exhaust-Gas Inflow Side | 400 | 60 | 50 | 146 |

<Average Filling Ratios>

Figure 7:
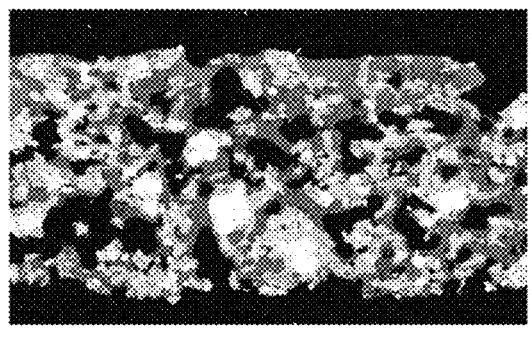
FIG. 7 is an SEM image of the cross section of a partition wall in Example 1.
Figure 8:
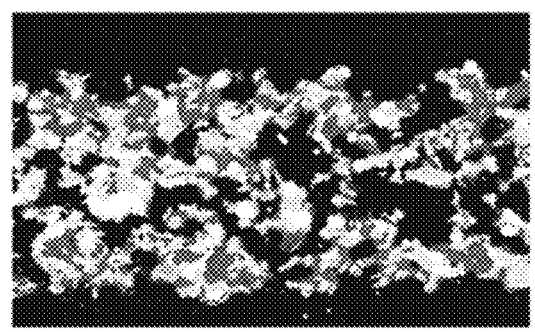
FIG. 8 is an SEM image of the cross section of a partition wall in Comparative Example 1.
Figure 9:
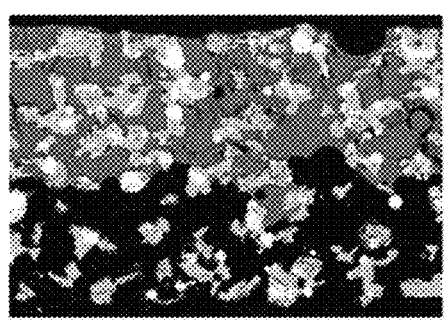
FIG. 9 is an SEM image of the cross section of a partition wall in Comparative Example 2.

For the filters of Example 1 and Comparative Example 1, SEM images of the cross section of the partition wall of the filters of Example 1 and Comparative Example 1 were taken to measure the pore sizes of the inside pores of the partition wall in which the catalyst layer was held and the filling ratios of the catalyst layer held by the pores. Then, the arithmetic mean of the filling ratio of the catalyst layer for each pore size range was calculated to derive an average filling ratio A of the catalyst layer held by pores having a pore size of 5 μm or more and less than 10 μm, an average filling ratio B of the catalyst layer held by pores having a pore size of 10 μm or more and less than 20 μm, an average filling ratio C of the catalyst layer held by pores having a pore size of 20 μm or more and less than 30 μm, and an average filling ratio D of the catalyst layer held by pores having a pore size of 30 μm or more. Results are shown in Table 2. Further, an SEM image of the cross section of a partition wall in Example 1 is shown in FIG. 7, an SEM image of the cross section of a partition wall in Comparative Example 1 is shown in FIG. 8, and an SEM image of the cross section of a partition wall in Comparative Example 2 is shown in FIG. 9.

TABLE 2

| | Average Filling Ratio A (%) 5 to 10 μm | Average Filling Ratio B (%) 10 to 20 μm | Average Filling Ratio C (%) 20 to 30 μm | Average Filling Ratio D (%) 30 μm or more |
|---|---|---|---|---|
| Example 1 | 73.1 | 79.2 | 85.1 | 46.7 |
| Comparative Example 1 | 93.1 | 89.5 | 47.7 | 15.4 |

As shown in Table 2, it was found that the relationship among the average filling ratio A of the catalyst layer held by the pores having a pore size of 5 μm or more and less than 10 μm, the average filling ratio B of the catalyst layer held by the pores having a pore size of 10 μm or more and less than 20 μm, and the average filling ratio C of the catalyst layer held by the pores having a pore size of 20 μm or more and less than 30 μm, was expressed as A<B<C and the catalyst layer was preferentially formed in the pores having a large pore size among the inside pores of the partition wall in the filter of Example 1 manufactured using the absorption coating method. On the other hand, it was found that the relationship among the average filling ratio A of the catalyst layer held by the pores having a pore size of 5 μm or more and less than 10 μm, the average filling ratio B of the catalyst layer held by the pores having a pore size of 10 μm or more and less than 20 μm, and the average filling ratio C of the catalyst layer held by the pores having a pore size of 20 μm or more and less than 30 μm, was expressed as A>B>C and the catalyst layer was uniformly distributed in each pore compared with Example 1 in the filter of Comparative Example 1 manufactured using the immersion method.

<Ratios of Pressure Losses>

For the filters of Example 1 and Comparative Example 1, pressure losses $P_{10}$, $P_{50}$, and $P_{90}$ of a part corresponding to 10%, 50%, and 90% of the length of the base material from the end on the exhaust-gas inflow side to the downstream side of the base material were measured to calculate the values of the ratios $P_{10}/P_{50}$ and $P_{90}/P_{50}$. Note that the pressure losses $P_{10}$, $P_{50}$, and $P_{90}$ were measured by the above pressure loss measurement device using a specimen cut out from each base material according to the above method. Results are shown in Table 3.

TABLE 3

| | $P_{10}/P_{50}$ | $P_{90}/P_{50}$ |
|---|---|---|
| Example 1 | 1.007 | 0.995 |
| Comparative Example 1 | 1.008 | 1.002 |

As shown in Table 3, the ratios $P_{10}/P_{50}$ and $P_{90}/P_{50}$ in each of the filters of Example 1 and Comparative Example 1 were 0.9 or more and 1.1 or less, and a difference in the pressure loss between the places was small in the length direction of the base material. From the results, it was found that the catalyst layer satisfying the relationship (A<B<C) of the average filling ratios can be more uniformly formed at the same level as Comparative Example 1 (for example, the catalyst layer can be uniformly formed with a small fluctuation in coating amount in the length direction of the base material) when the slurry was absorbed so as to be coated on the part corresponding to at least 80% of the length of the base material from the end F to the end R of the base material, and coated on the region extending from the surface of the partition wall and covering at least 90% of the thickness of the partition wall.

<50% Purification Ratio>

Figure 10:
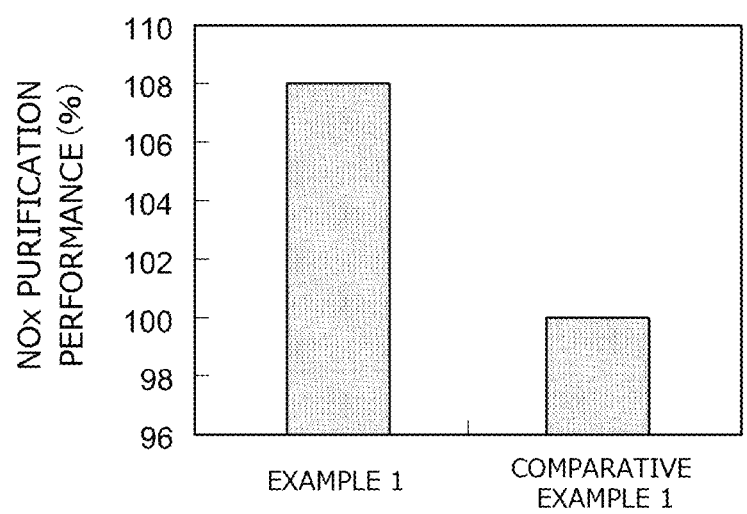
FIG. 10 is a graph in which the NOx purification ratios of the respective Examples are compared with each other.

For the filters of Example 1 and Comparative Example 1, NOx purification performance was evaluated. Specifically, each of the filters was attached to a diesel engine, exhaust gas was caused to circulate, and urea water was added from the upstream side of the filter to measure a NOx purification ratio. Here, the NOx purification ratio (%) was calculated by "(NOx concentration (ppm) of gas containing a catalyst—NOx concentration (ppm) of gas excluding the catalyst)/NOx concentration (ppm) of the gas containing the catalyst"×100. Results are shown in FIG. 10. FIG. 10 is a graph in which the NOx purification ratios of the respective Examples are compared with each other. Here, the NOx purification ratios are shown as relative values assuming that the NOx purification ratio of Comparative Example 1 is 100%.

As shown in FIG. 10, the filter of Example 1 in which the relationship among the average filling ratio A of the catalyst layer held by the pores having a pore size of 5 μm or more and less than 10 μm, the average filling ratio B of the catalyst layer held by the pores having a pore size of 10 μm or more and less than 20 μm, and the average filling ratio C of the catalyst layer held by the pores having a pore size of 20 μm or more and less than 30 μm, had a remarkably improved NOx purification ratio compared with Comparative Example 1 although the coating amount of the catalyst layer was the same. From the results, it was found that an improvement in the purification performance was allowed when the relationship among the average filling ratios of the catalyst layer A<B<C was established.

<Measurement of Pressure Losses>

The filer of each of the Examples was placed in a blower-type pressure loss measurement device, and a pressure loss was measured from front and rear static pressure differences. Here, the flow rate of air was set at 6 m³/min. Further, a filter base material (Reference Example) without a catalyst layer was also subjected to the same test. Results are shown in Table 1. In Table 1, the relative value (i.e., the pressure loss increasing ratio with respect to the base material) of each sample is shown assuming that the pressure loss of Reference Example is 100%.

As shown in Table 1, Examples 1 and 2 in which the coating depth of the slurry was set at 100% had a pressure loss increasing ratio of 126% or less, and obtained more excellent results in the pressure loss compared with Comparative Examples 2 and 3 in which the coating depth of the slurry was set at 53% or less. It is presumed that Examples 1 and 2 exhibited a lower pressure loss since the slurry was coated at a depth of 100%. From the above results, it is confirmed that filters in which the relationship among the average filling ratios of the catalyst layer satisfies A<B<C and slurry is coated at a depth of 100% can achieve both a low pressure loss and excellent purification performance at a high level.

Test Example 2

In the present Example, in the above manufacturing process of the filters, the SiC base material was changed to a cylindrical cordierite wall-flow-type base material (having a diameter of 144 mm and an entire length of 150 mm), and a coating method, the ends (coating ends) on which the slurry was coated, the input amount, the coating width, and the coating depth of the slurry were made different as shown in Table 1 in the input of the first slurry and the second slurry to manufacture filters. The catalyst layer was coated at a constant amount of 240 g/L per liter of the base material. Then, the pressure losses of the obtained filters were measured according to the method described above. Results are shown in Table 4.

TABLE 4

| | Coating Method | Input of First Slurry | | | | Input of Second Slurry | | | | Pressure Loss Increasing Ratio (%) |
|---|---|---|---|---|---|---|---|---|---|---|
| | | Coating End | Input Amount (g) | Coating Width (%) | Coating Depth (%) | Coating End | Input Amount (g) | Coating Width (%) | Coating Depth (%) | |
| Example 3 | Absorption | Exhaust-Gas Inflow Side | 850 | 100 | 100 | Exhaust-Gas Outflow Side | 0 | — | 100 | 119 |
| Example 4 | Absorption | Exhaust-Gas Inflow Side | 600 | 95 | 100 | Exhaust-Gas Outflow Side | 200 | 30 | 100 | 118 |
| Example 5 | Absorption | Exhaust-Gas Inflow Side | 530 | 80 | 92 | Exhaust-Gas Outflow Side | 270 | 40 | 93 | 119 |
| Comparative Example 4 | Immersion | — | — | — | 100 | — | — | — | 100 | 119 |
| Comparative Example 5 | Absorption | Exhaust-Gas Inflow Side | 460 | 70 | 66 | Exhaust-Gas Outflow Side | 340 | 50 | 67 | 130 |
| Comparative Example 6 | Absorption | Exhaust-Gas Inflow Side | 400 | 60 | 54 | Exhaust-Gas Outflow Side | 400 | 60 | 53 | 140 |

As shown in Table 4, Examples 3 to 5 in which the coating depth of the first and second slurry was set at 90% or more had a pressure loss increasing ratio of 120% or less and obtained more excellent results in the pressure loss compared with Comparative Examples 5 and 6 in which the coating depth of the first and second slurry was set at 70% or less. From the results, the coating depth of the first and second slurry is preferably set at 90% or more. Note that the coating depth becomes larger as the coating width is longer in the input of the first slurry, but the coating depth becomes larger as the coating width is shorter in the input of the second slurry. This is because since air flows in a noncoated part in the second absorption, the longer coating width in the input of the first slurry (the shorter coating width in the input of the second slurry) makes a force for drawing the slurry into the partition wall larger in the second absorption. For this reason, the coating depth increases.

Text Example 3

Figure 11:
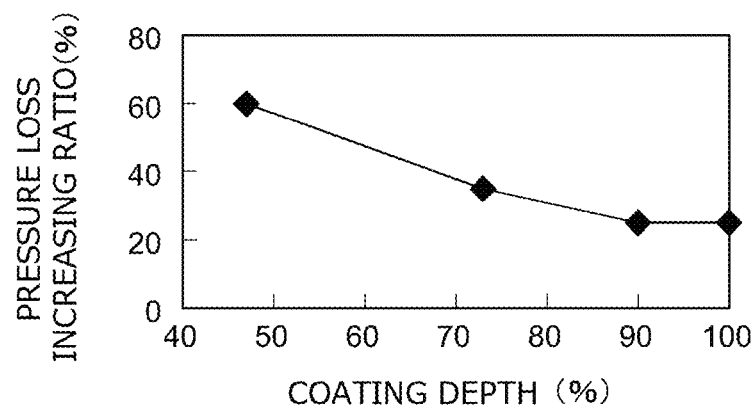
FIG. 11 is a graph showing the relationship between a coating depth and a pressure loss increasing ratio.

In the present example, the following test was conducted to confirm the influence of the coating depth of the slurry on the pressure loss. That is, in the manufacturing process of the filter in Example 1 described above, the coating depth of the first and second slurry was made different as shown in Table 1 to manufacture filters. Here, the slurry had a different viscosity $\eta_{400}$ of 15 mPa·s (Example 1), 25 mPa·s (Example 6), 60 mPa·s (Comparative Example 7), or 100 mPa·s (Comparative Example 8) to manufacture a filter. The coating width in the input of the first slurry was constantly set at 95%, the coating width in the input of the second slurry was constantly set at 30%, and the coating amount of the catalyst layer was constantly set at 240 g/L coated per liter of the base material. Results are shown in Table 5 and FIG. 11. FIG. 11 is a graph showing the relationship between the coating depth of the slurry and the pressure loss.

TABLE 5

| | Coating Method | Input of First Slurry | | | | Input of Second Slurry | | | | Pressure Loss Increasing Ratio (%) |
|---|---|---|---|---|---|---|---|---|---|---|
| | | Coating End | Input Amount (g) | Coating Width (%) | Coating Depth (%) | Coating End | Input Amount (g) | Coating Width (%) | Coating Depth (%) | |
| Example 1 | Absorption | Exhaust-Gas Inflow Side | 600 | 95 | 100 | Exhaust-Gas Outflow Side | 200 | 30 | 100 | 125 |
| Example 6 | Absorption | Exhaust-Gas Inflow Side | 600 | 95 | 93 | Exhaust-Gas Outflow Side | 200 | 30 | 90 | 125 |
| Comparative Example 7 | Absorption | Exhaust-Gas Inflow Side | 600 | 95 | 72 | Exhaust-Gas Outflow Side | 200 | 30 | 73 | 135 |
| Comparative Example 8 | Absorption | Exhaust-Gas Inflow Side | 600 | 95 | 47 | Exhaust-Gas Outflow Side | 200 | 30 | 47 | 160 |

As shown in Table 5 and FIG. 11, Examples 1 to 6 in which the coating depth of the slurry was set at 90% or more had a pressure loss increasing ratio of 125% or less and obtained more excellent results in the pressure loss compared with Comparative Examples 7 and 8 in which the coating depth was set at 75% or less. From the results, the coating depth of the slurry is preferably set at at least 90%.

Various modified examples of the particulate filter 100 and the exhaust gas purification device 1 having the particulate filter 100 are exemplified above, but the structures of the particulate filter 100 and the exhaust gas purification device 1 are not limited to any of the embodiments described above.

For example, the length $L_A$ of the part of the upstream-side catalyst layer 20A is longer than the length $L_B$ of the part of the downstream-side catalyst layer 20B in the length direction of the base material in the embodiments, but the configuration of the catalyst layer 20 is not limited to this. For example, like Example 2, the length $L_B$ of the part of the downstream-side catalyst layer 20B may be longer than the length $L_A$ of the part of the upstream-side catalyst layer 20A. Further, like Example 3, the slurry may be input once to form the catalyst layer 20 without separating the upstream-side catalyst layer 20A and the downstream-side catalyst layer 20B from each other. In this case as well, the relationship among the average filling ratios A, B, and C of the catalyst layer held by the pores in respective pore size ranges satisfies the above relationship A<B<C, and the catalyst layer is formed in the region extending from the surface of the partition wall and covering at least 90% of the thickness of the partition wall, whereby both a reduction in the pressure loss and an improvement in the catalyst purification performance can be achieved at a high level.

Further, the respective members and the shapes and structures of the portions of the exhaust gas purification device 1 may be changed. The catalyst portion is provided on the upstream side of the filter portion in the example shown in FIG. 1, but may be omitted. The exhaust gas purification device 1 is particularly suitable as, for example, a device such as a gasoline engine that purifies harmful components in exhaust gas that is exhausted at a relatively high exhaust temperature. However, the purpose of the exhaust gas purification device 1 according to the present invention is not limited to the purification of harmful components in exhaust gas from a gasoline engine, but the exhaust gas purification device 1 can be used in various applications to purify harmful components in exhaust gas discharged from other engines (for example, a diesel engine).

INDUSTRIAL APPLICABILITY

According to the present invention, it is possible to provide an exhaust gas purification device that can improve exhaust gas purification performance while reducing a pressure loss.

The invention claimed is:

1. An exhaust gas purification device that is arranged in an exhaust path of an internal combustion engine and purifies exhaust gas discharged from the internal combustion engine, the exhaust gas purification device comprising:
   a wall-flow-structured base material having input-side cells in each of which only an end on an exhaust-gas inflow side is opened, output-side cells which are arranged adjacent to the input-side cells and in each of which only an end on an exhaust-gas outflow side is opened, and a porous partition wall that partitions the input-side cells and the output-side cells; and
   a catalyst layer formed inside the partition wall, wherein the catalyst layer is formed in a region that extends from a surface of the partition wall contacting the input-side cells or the output-side cells and that covers at least 90% of a thickness of the partition wall, the catalyst layer being held by surfaces of inside pores of the partition wall in the region, and
   a relationship among an average filling ratio A of the catalyst layer held by pores having a pore size of 5 µm or more and less than 10 µm, an average filling ratio B of the catalyst layer held by pores having a pore size of 10 µm or more and less than 20 µm, and an average filling ratio C of the catalyst layer held by pores having a pore size of 20 µm or more and less than 30 µm among the inside pores of the partition wall in which the catalyst layer is held, satisfies a following expression A<B<C.

2. The exhaust gas purification device according to claim 1, wherein,
   when pressure losses obtained by cutting out a part corresponding to 10%, 50%, and 90% of a length of the base material from the end on the exhaust gas inflow side to a downstream side of the base material and causing gas to flow through the part are assumed as $P_{10}$, $P_{50}$, and $P_{90}$, respectively, following expressions $0.9 \leq P_{10}/P_{50} \leq 1.1$ and $0.9 \leq P_{90}/P_{50} \leq 1.1$ are satisfied.

3. The exhaust gas purification device according to claim 1, wherein
   the average filling ratio C of the catalyst layer held by the pores having a pore size of 20 µm or more and less than 30 µm is larger by 5% or more than the average filling ratio B of the catalyst layer held by the pores having a pore size of 10 µm or more and less than 20 µm.

4. The exhaust gas purification device according to claim 1, wherein
   the average filling ratio B of the catalyst layer held by the pores having a pore size of 10 µm or more and less than 20 µm is larger by 5% or more than the average filling ratio A of the catalyst layer held by the pores having a pore size of 5 µm or more and less than 10 µm.

5. The exhaust gas purification device according to claim 1, wherein
   the average filling ratio A is 75% or less,
   the average filling ratio B is larger than 75% and smaller than 85%, and
   the average filling ratio C is 85% or more.

6. The exhaust gas purification device according to claim 1, wherein
   an average filling ratio D of the catalyst layer held by pores having a pore size of 30 µm or more among the inside pores of the partition wall is smaller than the average filling ratio C of the catalyst layer held by the pores having a pore size of 20 µm or more and less than 30 µm.

7. The exhaust gas purification device according to claim 1, wherein
   the internal combustion engine is a gasoline engine.

* * * * *